Patented Sept. 26, 1950　　　　　　　　　　　　　　　　　　　　2,523,276

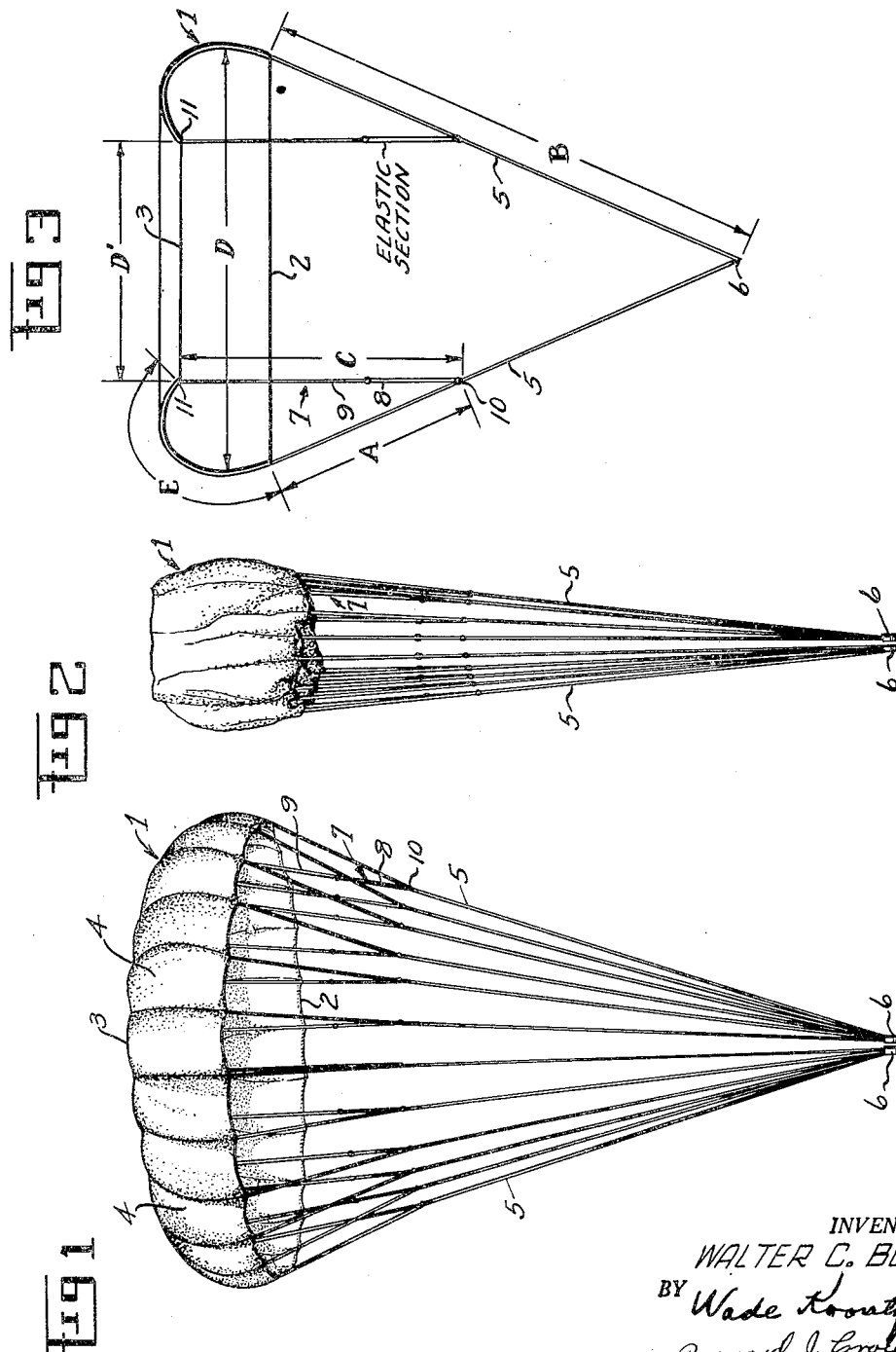

UNITED STATES PATENT OFFICE 2,523,276

AIRFOIL PARACHUTE

Walter C. Buhler, Dayton, Ohio

Application September 25, 1947, Serial No. 776,046

2 Claims. (Cl. 244—142)

(Granted under the act of March 3, 1883, as amended April 30, 1928; 370 O. G. 757)

The invention described herein may be manufactured and used by or for the Government for governmental purposes, without payment to me of any royalty thereon.

The present invention relates to parachute constructions particularly adapted for operation in conjunction with high speed aircraft such as to delay full opening until the parachute and load are decelerated to a predetermined safe opening speed. A parachute constructed in accordance with the present invention further produces a large deceleration force per unit of cloth area permitting a considerable reduction in weight of the parachute for a given load capacity and is further enhanced by increased stability.

In conventional parachutes employing a vent in the apex of the canopy, the vent diameter has seldom exceeded more than ten percent of the nominal inflated diameter of the parachute and the resistance of such a parachute is primarily due to its flat plate resistance based either on the projected area of the canopy or on the actual cloth area. Increasing the vent diameter of the parachute while maintaining the cloth area constant has no marked effect on the drag or resistance coefficient until vent diameters of forty-five percent of the nominal inflated diameter are reached whereupon the drag coefficient suddenly increases substantially linearly with increase of vent diameter percentage. This effect is believed to be due to the fact that sufficient mass flow takes place through the vent opening to permit circulation about the canopy so that the latter acts as an airfoil and produces lift which increases the total resultant decelerating force and the resistance coefficient.

Merely increasing the vent diameter however has the serious disadvantage that the critical opening speed is very low and at all speeds above the critical the parachute canopy streams or squids, i. e., tends to assume the shape of a cylinder. For high speed high altitude work it is essential that the critical speed for opening be in excess of the terminal velocity of the human body in free fall, namely, one hundred thirty-five miles per hour.

In accordance with the present invention the airfoil effect present when the vent diameter is increased to 45% or more is further enhanced by the use of auxiliary suspension lines secured to the canopy at the periphery of the vent opening, which lines are connected to the main suspension lines so that the curvature of the canopy when inflated is considerably increased. By proper design of the length of the auxiliary suspension lines the parachute canopy can be made to have a critical opening speed well in excess of the terminal velocity of the human body and parachute in free fall. In order to reduce opening shock the auxiliary suspension lines may include resilient sections which permit the canopy to squid or stream at speeds above the critical opening speeds, or the auxiliary lines may be made entirely of a resilient material such as undrawn nylon or other synthetic fiber capable of approximately 100% elongation without permanent set. This feature greatly reduces opening shock by delaying opening time until the critical opening speed is reached.

It is, therefore, the principal object of this invention to provide a parachute construction in which the canopy is provided with a vent opening in the apex thereof having a diameter such that the canopy may act as a circular airfoil, auxiliary suspension lines being provided to increase the curvature of the canopy when inflated so as to increase the resultant force per unit of cloth area and preventing the parachute from streaming at speeds below a predetermined critical opening speed of descent.

It is a further object of the invention to provide, in a parachute of the class described, resilient means associated with the auxiliary suspension lines or to construct the said lines of a resilient material such that the parachute canopy may stream to delay complete opening until the speed of the parachute and attached load reach a predetermined critical velocity.

Other objects and features of the invention will become apparent by reference to the detailed description hereinafter given and to the appended drawing, in which:

Fig. 1 is a perspective view of an inflated parachute in accordance with the invention;

Fig. 2 is a view showing the parachute of Fig. 1 streaming prior to inflation at a predetermined speed of descent; and Fig. 3 is a schematic cross-sectional view of the parachute of Fig. 1 illustrating the critical dimensions.

Referring now to Fig. 1, reference numeral 1 comprises a fabric canopy having a skirt portion 2 and a vent opening 3, best seen in Fig. 3. The canopy is so constructed that, when inflated but not under load, the canopy forms a zone of a sphere and the panels 4 are so cut and stitched that the completed canopy will conform to a spherical surface. Hence, the canopy when deflated will not lie in a flat surface.

The canopy has secured thereto main suspension lines 5 which extend from the skirt 2 downward to load attachment fittings such as 6 which may be directly attached to cargo, or in the case of a parachute intended for use with aviators, would be secured to lift risers of a conventional parachute harness, not shown. The upper ends of the main suspension lines 5 may be incorporated in the panel seams and extend from the canopy skirt to the vent ring opening thereof in a manner similar to the attachment of suspension lines in conventional parachute construction.

In addition to the main suspension line, auxiliary suspension lines generally designated by the reference numeral 7, which may include an elastic portion 8 and nonelastic section 9, are secured to each respective main suspension line as indicated by the reference numeral 10 and extend upward and are secured at their other ends to the periphery of the vent ring opening 3. This will be more clear by reference to the cross section shown in Fig. 3. The distance of the point of attachment of the auxiliary suspension lines 7 to the main suspension lines 5 measured from the skirt of the canopy as well as the overall length of the auxiliary suspension lines are critical features of the invention as will be later explained.

When the parachute is ejected from a pack or drops from an aircraft traveling at high speeds such as three hundred miles an hour, the parachute assumes the form as illustrated in Fig. 2; that is, the canopy tends to stream in the direction of the moving air stream and this streaming is considerably influenced by the provision of the elastic sections 8 of the auxiliary lift lines. While streaming, the air stream passes directly through the parachute vent opening and the parachute will not open until it and the attached load is decelerated in velocity to a critical opening velocity which, preferably when employed with humans, is somewhat in excess of one hundred thirty-five miles per hour which is the terminal velocity of a human body in free fall in air. When the predetermined critical opening velocity is reached the parachute then opens, with a minimum of shock, to the inflated condition as illustrated in Fig. 1.

Due to the very large vent opening 3 (see Fig. 3), there is a sufficient mass flow of air through the parachute as to give rise to an aerodynamic lift effect on the canopy which is normally absent in parachutes having vent diameters less than forty percent of the nominal inflated diameter of the parachute. In order to further increase the lifting effect of the canopy the auxiliary suspension lines 7 considerably increase the curvature of the canopy when it is inflated under load so that a canopy constructed in accordance with the present invention will give maximum drag coefficients at a normal velocity of descent equal to .78 or higher based on cloth area as compared to a value of approximately .71 obtained with conventional flat parachute canopies with small vent openings. The provision of the auxiliary suspension lines 7 with an elastic section 8 therein permits the control of the curvature of the canopy when inflated, and hence the value of the drag coefficient which can be obtained and the length of the suspension lines further determines the value of the critical opening velocity. By proper adjustment of the length of these lines the critical opening velocity can be made equal to, or well in excess of, the terminal dropping velocity of the human body.

When the parachute begins to open from the streaming condition as seen in Fig. 2 to the fully inflated condition, such as illustrated in Fig. 1 the elastic sections 8 of the auxiliary suspension lines 7 will stretch so that the maximum curvature of the canopy is obtained more slowly and the full inflation of the parachute canopy is delayed for a period of from two to four seconds, which greatly reduces the opening shock of the parachute both on cargo or the body of a human being. Tests have indicated that this parachute will operate very satisfactorily at flight speeds well in excess of three hundred miles per hour.

In Figs. 1 and 3 the auxiliary suspension lines 7 are illustrated as having a short elastic section which may be made of small diameter rubber shock cord or the like. However, it is to be understood in lieu of a short elastic section the whole auxiliary suspension line may be made of an elastic material such as undrawn nylon or other synthetic fiber provided that the line may be extended as much as one hundred percent elongation without permanent set. Lines so constructed are accordingly within the scope of the invention. Fig. 3 illustrates the principal dimensions of a parachute constructed in accordance with the invention in which B indicates the overall length of the main suspension lines from the canopy skirt to the point of load attachment 6. The letter C represents the undeflected length of the auxiliary suspension lines from their point of attachment 11 at the periphery of the vent ring opening 3 to the point of attachment 10 to the main suspension lines 5. The dimension A is the distance measured from the canopy skirt to the point of attachment of the auxiliary suspension lines 7 and the nominal inflated diameter of the parachute canopy as indicated by the dimension D. The dimension D' indicates the diameter of the vent ring opening 3 in the apex of the canopy while the dimension E indicates the arcuate width of the canopy measured from the skirt to the periphery of the vent opening 3. The relationship of the various dimensions of the parachute and the necessary values of each will now be described.

In preparing a preliminary design of a parachute in accordance with the invention the desired maximum load and safe velocity of descent desired must be known or assumed. Then by using a drag coefficient $C_{D^\circ} = 0.78$ as compared with the value of 0.71 for a standard flat parachute the necessary cloth area may be determined from the drag formula, $$L = C_{D^\circ} \rho/2\ AV^2$$

where

L = the load to be supported
$C_{D^\circ}$ = the drag coefficient
A = the cloth area of the canopy in sq. ft.
$\rho$ = the mass density of air
V = the maximum desired velocity of descent in feet per second In general the parachute canopy when inflated without load will take the form of a zone of a sphere and knowing the required cloth area the radius of the sphere can be determined from the formula for the surface area of a sphere $A = 2\pi Rh$ where R is the radius of the sphere and h is the distance between the parallel planes of the zone. Since this equation contains two variables it is necessary in order to solve for R to assume a value of h.

Having determined the value of R the location of the skirt diameter D and vent diameter D' where D' is assumed to be some definite fraction of D varying between the values of 0.45 and 0.65 and spaced apart distance $h$ may be easily graphically determined. For good design the central angle between radii of the sphere drawn through the terminal ends of the chord of the circle corresponding to skirt diameter should be about 106 degrees and if the trial solution indicates a considerably different value a new value of $h$ must be selected and the computation repeated. Several trials will give a close approximation of the desired design. Once the desired values of R, $h$, D and D' are arrived at the value of E (Fig. 3) the length of the arc from skirt to vent may be readily computed.

The length B of the main suspension lines 5 (Fig. 3) is made from one to one and a half times the diameter D of the parachute and is not critical except that other dimensions are governed accordingly.

It will be apparent by inspection of Fig. 3 that the length C of the auxiliary suspension lines 7 and the dimension A of the point of attachment 10 of these lines to the main suspension lines 5 will control the curvature of the canopy when inflated and hence will govern the value of $C_{D°}$ of the drag coefficient. By making length C a minimum and A a maximum a high value of $C_{D°}$ will be attained which will give a maximum value of weight sustained per unit of cloth area but will increase the value of critical opening speed. For use on cargo where opening shock loads are less critical the maximum curvature of the canopy would be employed while for use with personnel the auxiliary lines would be made longer and secured to the auxiliary lines closer to the canopy skirt. The limits of the dimensions A and C (Fig. 3) are as follows:

$A = 0.25$ to $0.5 B$ measured from the canopy skirt
$C = A + XE$ where X is a fraction with limits of from 0.4 to 0.6 and E is the arcuate width of the canopy from skirt to vent.

With the above limits for the values of dimensions A and C the critical opening speed can be varied in the range of from 115 to about 200 miles per hour and tests have indicated satisfactory operation with minimum shock where the speed of flight of the aircraft is over 300 miles per hour.

While a preferred form of the invention has been disclosed in the specification and drawings, the scope of the invention is not limited except as defined in the appended claims.

I claim:
1. A parachute construction comprising a canopy constructed to form the surface of a zone of a sphere and having a skirt portion and a circular vent opening in the apex thereof, the diameter of said vent opening being within the limits of from forty-five to sixty-five percent of the nominal diameter of the skirt, main suspension lines extending from the canopy skirt and having a length not less than the skirt diameter, auxiliary suspension lines secured to the canopy at the periphery of the vent opening and to the main suspension lines at a point measured from the canopy skirt of from one-fourth to not more than one-half the length of the main suspension lines and the length of the auxiliary suspension lines being such as increase the curvature of the canopy from that of a circular arc, said auxiliary suspension lines being sufficiently resilient to permit the canopy to stream at speeds of descent above a predetermined critical opening speed.

2. A parachute construction characterized by delayed opening at high speed and low opening shock forces comprising a fabric canopy substantially in the form of a zone of a sphere and having a vent opening in the apex thereof at least forty-five percent of the nominal inflated diameter of the canopy, main suspension lines secured to the canopy and extending below the skirt thereof to the point of attachment of a load and auxiliary suspension lines connected to the canopy at the periphery of the vent opening and each connected to a respective main suspension line at a point of attachment measured from the canopy skirt of from one-fourth to one-third the length of the main suspension lines and the length of each of the auxiliary suspension lines being equal to the distance from the canopy skirt to the point of attachment of the auxiliary lines to the main suspension lines plus a length equal from forty to sixty percent of the arcuate width of the canopy from the skirt to the vent opening, the length of the auxiliary suspension lines thus being such as to produce a pronounced inward curvature of the canopy adjacent the vent opening when the canopy is inflated under load.

WALTER C. BUHLER.

REFERENCES CITED

The following references are of record in the file of this patent:

FOREIGN PATENTS

| Number | Country | Date |
|--------|---------|------|
| 284,424 | Italy | Apr. 1, 1931 |
| 417,048 | Germany | July 23, 1921 |
| 874,035 | France | Apr. 13, 1942 |